UNITED STATES PATENT OFFICE.

J. PARK ALEXANDER, OF AKRON, OHIO.

IMPROVEMENT IN THE MANUFACTURE OF FIRE-BRICK.

Specification forming part of Letters Patent No. 170,502, dated November 30, 1875; application filed July 12, 1875.

CASE B.

*To all whom it may concern:*

Be it known that I, J. PARK ALEXANDER, of Akron, in the county of Summit and State of Ohio, have invented certain new and useful Improvement in the Manufacture of Fire-Brick; and I do hereby declare the following to be a full, clear, and exact description of the invention, such as will enable others skilled in the art to which it pertains to make and use it, reference being had to the accompanying drawings, which form part of this specification.

My invention relates to the manufacture of fire-brick, and consists as follows: White pebble, found in conglomerate rock, is first thoroughly and completely separated from sand and other foreign substances mixed therewith, without breaking or pulverizing the pebble. They are then ground or pulverized, and the powder thus obtained thoroughly mixed or kneaded with from one to twenty per cent. of lime, according to the quality of brick required; molded and subjected to very heavy pressure in steel molds; thoroughly dried; and finally burned in fire-brick kilns in an intense degree of heat.

The pebble, sand, &c., mixed together in conglomerate rock, gravel or sandy beds, and other places, but principally in conglomerate rocks—as I do not think the pebble is found in as pure a state elsewhere—are first placed in suitable machinery constructed for the purpose, where it is subjected to thorough sifting, beating, agitation, &c., without breaking or injuring them, until all sand and foreign substances are removed, leaving the pure white pebbles. These are then gone over again, if necessary, and then placed in suitable grinding or pulverizing machines, where they are granulated or reduced to a fine or impalpable powder. From one to twenty per cent. of lime, according to the quality of brick required, is next thoroughly mixed or kneaded with the pulverized pebble. The material thus obtained is then molded and subjected to a very heavy pressure in steel molds, then thoroughly dried, and finally burnt in fire-brick kilns in a great degree of heat.

Having thus described my invention, what I claim as new, and desire to secure by Letters Patent, is—

The compound for the manufacture of fire-brick, consisting of pure pulverized white pebbles and lime, prepared and compounded in the proportions substantially as and for the purposes described.

In testimony that I claim the foregoing I have hereunto set my hand this 23d day of June, 1875.

J. PARK ALEXANDER.

Witnesses:
 H. V. BROWN,
 A. G. BOTZUM.